Figure 1:
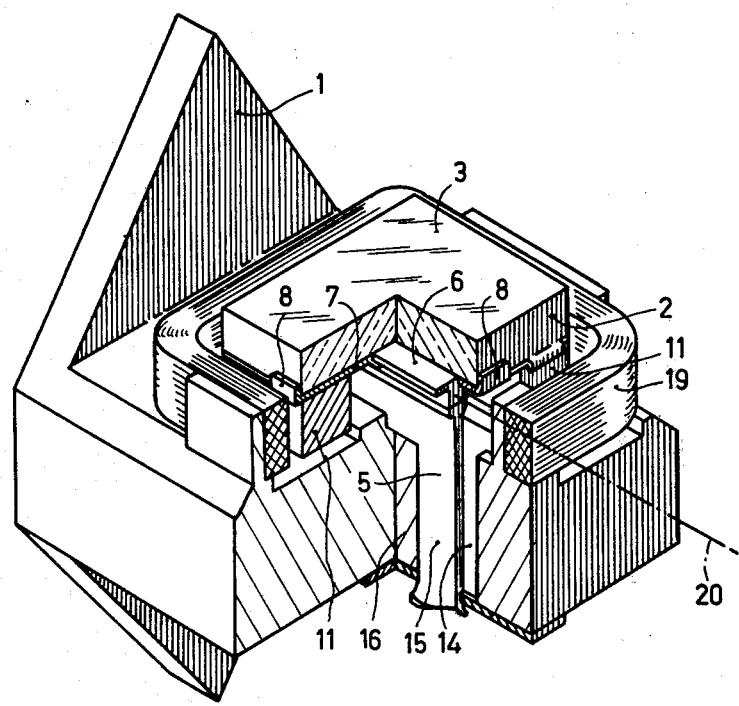

United States Patent [19]

Dragt

[11] 4,123,146
[45] Oct. 31, 1978

[54] ELECTRICALLY CONTROLLABLE PIVOTING MIRROR ARRANGEMENT

[75] Inventor: Jan C. W. Dragt, Eindhoven, Netherlands

[73] Assignee: U.S. Philips Corporation, New York, N.Y.

[21] Appl. No.: 787,079

[22] Filed: Apr. 13, 1977

[30] Foreign Application Priority Data

Jan. 24, 1977 [NL] Netherlands .......................... 7700674

[51] Int. Cl.² ............................................. G02B 27/17
[52] U.S. Cl. ...................................... 350/285; 350/6.5
[58] Field of Search ......................... 350/6, 7, 285, 6.5, 350/6.6; 358/128, 199; 179/100.3 V

[56] References Cited

U.S. PATENT DOCUMENTS

| 3,011,124 | 11/1961 | Hermann et al. | 350/285 X |
| 3,892,478 | 7/1975 | Lampkin | 350/285 X |
| 4,057,331 | 11/1977 | Ong et al. | 350/285 |
| 4,063,287 | 12/1977 | van Rosmalen | 350/7 X |

*Primary Examiner*—F. L. Evans
*Attorney, Agent, or Firm*—Frank R. Trifari; Simon L. Cohen

[57] ABSTRACT

An electrically controllable pivoting mirror arrangement comprises a pivoting mirror which is mounted on a frame with the aid of a mirror support and which carries permanent magnetic means at its back for producing a permanent magnetic field for electrical control purposes. Between the pivoting mirror and the permanent magnetic means a mounting plate is located which comprises means for positioning the pivoting mirror and the permanent magnetic means. The mounting plate may also serve for clamping a mirror bearing which is made of rubber-like material or for positioning the mirror bearing when this is glued onto the back of the pivoting mirror.

3 Claims, 3 Drawing Figures

ELECTRICALLY CONTROLLABLE PIVOTING MIRROR ARRANGEMENT

The invention relates to an electrically controllable pivoting mirror arrangement which is suitable for use in an apparatus for optically reading information tracks of an information carrier with the aid of a beam of radiation, or for writing information tracks on an information carrier, more in particular suitable for use in an optically reading video disc player, and comprising a frame, a pivoting mirror with a reflecting front and with a back, permanent magnetic means which are rigidly mounted on the back of the pivoting mirror for producing a permanent magnetic field for the electrical control of the pivoting mirror, and a mirror support for pivotably supporting the pivoting mirror and comprising a bearing support which is connected to the frame and a mirror bearing which is disposed between the bearing support and the back of the pivoting mirror.

In the past the Applicant has filed several Applications for pivoting mirror arrangements of the above-mentioned type, see for example U.S. Pat. No. 4,057,331 and U.S. Pat. No. 4,021,096. Mounting the permanent magnetic means, for example consisting of two rod-shaped permanent magnets, on the back of the pivoting mirror has the advantage that in conjunction with a suitable bearing construction a bearing arrangement can be obtained which is such that the axis (or the axes in the case of an omni-directionally pivotable pivoting mirror) about which the pivoting mirror is pivotable pass(es) through the center of gravity of the combination consisting of the pivoting mirror and the parts secured thereto which move along with the pivoting mirror. The importance of this will be explained further on. In view of the very stringent requirements imposed on the flatness of a pivoting mirror for use in a video disc player, it is desirable that the center of gravity is located outside the pivoting mirror, so that no recesses in the mirror itself are necessary which serve to transfer the pivoting point or the pivoting axis of the bearing arrangement further towards the front of the pivoting mirror.

The stringent requirements imposed on the flatness of pivoting mirrors for use in video disc players result from the requirments imposed on the quality of a read spot which is to be concentrated on the information tracks of a video disc by means of an optical system provided for this purpose. In view of the desired high density of the video information on the disc, the read spot should be of small size, have an as round as possible shape and moreover exhibit a highly homogeneous distribution of the radiation intensity over the light spot. This dictates quality requirements for all the optical means which are disposed in the path of the radiation beam. For example, in the case of a pivoting mirror with a front area of approximately 10 by 13 mm an out-of-flatness not greater than 0.1 micron is permissible measured over the diagonal of the front of the pivoting mirror. The pivoting mirror is generally made of glass and for the specified dimensions of the front side it has a thickness of approximately $2\frac{1}{2}$ mm for reasons of rigidity, in combination with the said flatness requirement. In order to prevent deformation of the mirror during manufacture or during use (for example under the influence of thermal stress) it is desirable that the mirror has a uniform thickness and consequently consists of a flat plate of material without recesses, cavities or local projections.

It is found advantageous to mount the pivoting mirror on the bearing support with the aid of a rubber-like elastic mirror support which is disposed between the back of the pivoting mirror and the bearing support. In the case of a suitable choice of the rubber-like material a substantial zero-point stability of the pivoting mirror arrangement can be achieved. Zero-point stability is to be understood the extent to which the pivoting mirror, after disappearance of electric control signals, resumes its neutral position. Such bearing arrangements moreover have the advantage that they may be subjected both to tensile and compressive stress, so that a robust construction can be obtained which is shock and vibration proof. The internal damping of the mirror bearing is favorable for the dynamic behaviour of the arrangement. In view of the dynamic behaviour it is furthermore favourable if the pivoting mirror pivots about an axis (or as the case may be a plurality of axes) which pass through the center of gravity of the moving part of the pivoting mirror arrangement, because thus parasitic resonances in the mirror bearing arrangement can be avoided. However, in this respect it is of great importance that the distance between the bearing support and the back of the pivoting mirror is small, preferably smaller than 3 mm, for example of the order of magnitude of 1 to $1\frac{1}{2}$ mm. In the case of too great dimensions of the elastic bearing, parasitic resonances will be produced in the bearing. Moreover, the pivoting axis (or the pivoting point) is geometrically less exact.

Handling the parts of the pivoting mirror arrangement during assembly, which parts are partly vulnerable and partly small, presents serious problems. In particular when the pivoting mirror arrangement should be suitable for mass production attention is to be paid to these problems. The pivoting mirror itself is provided with a radiation-reflection surface layer at its front which can readily be damaged. Rubber-like elastic mirror bearings which may be used, are of very small dimensions, but bearing arrangements of a different type will also be small and are likely to consist of several parts. The permanent magnets must be secured to the back of the mirror in an accurately defined position. Generally ceramic permanent magnets are employed which are rarely very flat. It is found that for a correct mounting of the permanent magnets to the back of the pivoting mirror it is desirable to use types of glue which do not cure quickly at room temperature, so that the permanent magnet remains slightly readjustable relative to the pivoting mirror after the application of the layer of glue, while the layer of glue must be suitable to at least partly fill any space between the magnets and the pivoting mirror. A suitable type of glue is for example the glue which is commercially available under the type designations Araldit-D (CIBA-Geigy Switzerland). Curing of the glue can be promoted at a higher temperature (for instance 70° C.) by placing the pivoting mirror with the permanent magnets mounted on it in an oven. This method of mounting the permanent magnets on the pivoting mirror appears to give rise to a high percentage of rejects because after the glue has cured a number of pivoting mirrors no longer comply with the standards of flatness. Apparently the pivoting mirror tends to warp owing to stresses in the layer of glue between the permanent magnets and the pivoting mirror. Mounting the very small mirror bearing in an accurately defined position on the back of the pivoting mirror also gives rise to problems.

It is an ojbect of the invention to provide a pivoting mirror arrangement of the type mentioned in the preamble whose various parts can be handled more easily during assembly, which yields less rejects owing to warping of the pivoting mirrors, and which is better suitable for mass production, and the invention is characterized in that between the pivoting mirror and the permanent magnetic means a mounting plate is interposed which on its side which faces the pivoting mirror is provided with means for positioning the pivoting mirror and on its other side is provided with means for positioning the permanent magnetic means. The mounting plate has a plurality of functions. In the first place it is an aid for accurately positioning the permanent magnets and the pivoting mirror. Secondly, it is possible to connect the permanent magnets first to the mirror mount, before fitting the pivoting mirror. It is then possible to use an other type of glue for securing the permanent magnets to the mounting plate than for mounting the pivoting mirror. It is for example found to be advantageous to mount the permanent magnets onto the mounting plate with the aid of the previously mentioned type of glue Araldit-D and to mount the pivoting mirror with the aid of a type of glue which is commercially available under the designation "Loctite IS 04 E" (Loctite, USA). This type of glue is almost as thin as water and can be applied after the pivoting mirror has been placed onto the mounting plate. Owing to the capillary action the liquid glue enters the small space between the pivoting mirror and the mounting plate, where it cures within a few seconds in the absence of air.

When a rubber-like elastic mirror bearing of the previously mentioned type is used an embodiment of the invention is also of importance which is characterized in that the mounting plate is provided with bearing mounting means on both sides of the mirror bearing between which the mirror bearing is clamped by its own elasticity. When this embodiment is used the bearing can be secured to the mirror mount without glueing. However, if it is desirable to glue the mirror bearing to the actual pivoting mirror, an other embodiment is of advantage in which the mounting plate is provided with means for positioning the mirror bearing.

Figure 3:
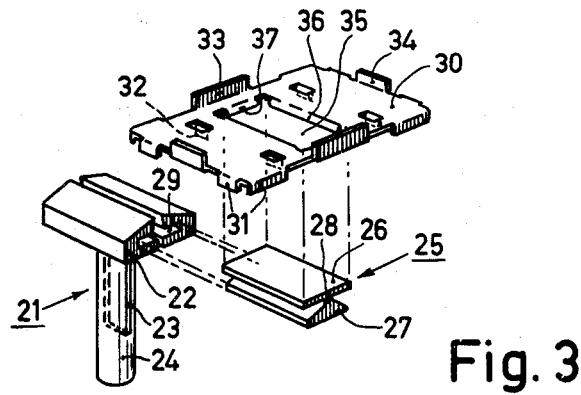
Figure 2:
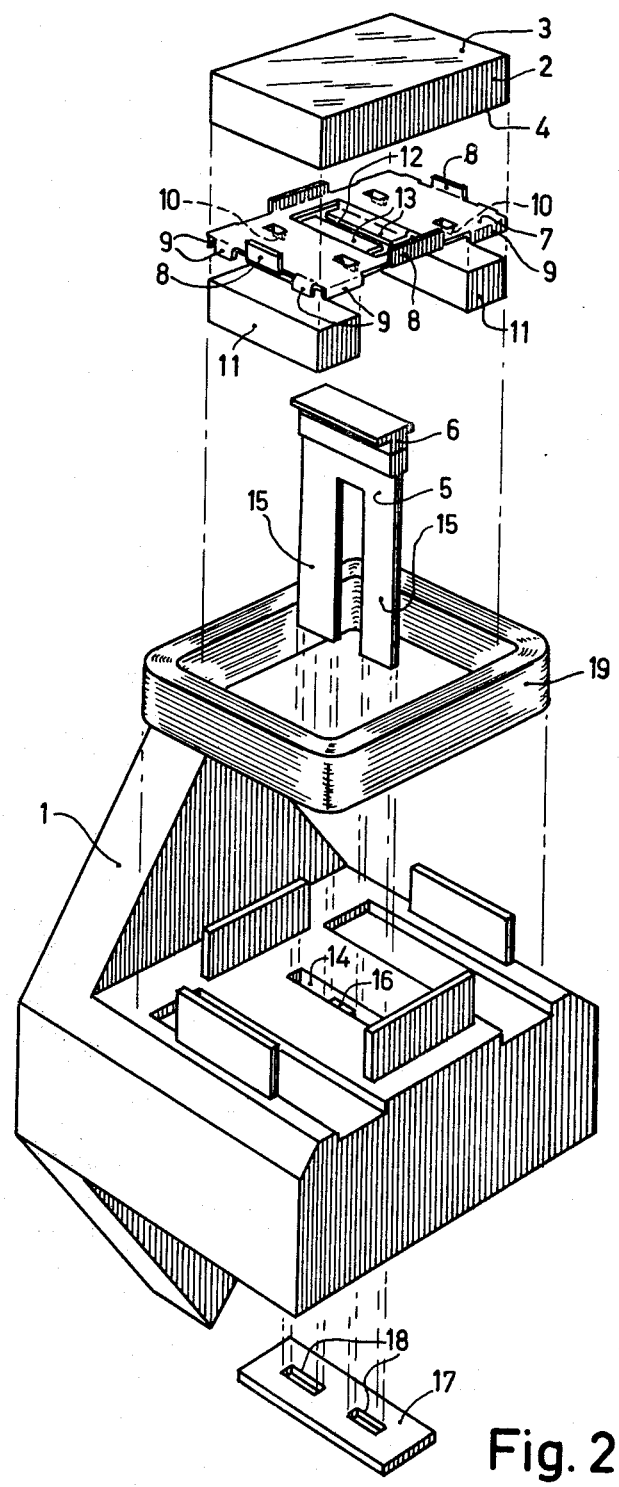

The invention will now be described in more detail with reference to the drawing, in which:

FIG. 1 is a perspective view, partly in cross-section of an embodiment of the invention in which the mirror bearing is clamped onto the mounting plate, FIG. 2 is an exploded view of the pivoting mirror arrangement in accordance with FIG. 1, and FIG. 3 is an exploded view of some parts of an alternative embodiment, in which the mirror bearing can be connected to a pivoting mirror by glueing.

The pivoting mirror arrangement in accordance with FIGS. 1 and 2 comprises a frame 1, pivoting mirror 2 having a reflecting front 3 and a back 4 opposite thereto. A mirror support for pivotably supporting the pivoting mirror on the frame comprises a bearing support 5 which is connected to the frame and a rubber-like elastic mirror bearing 6 which is interposed between the bearing support and the back of the pivoting mirror. This bearing consists of chloroprene rubber and is already connected to the bearing support 5 during the manufacture in mold. A light metal mount bears the reference numeral 7. The pivoting mirror 2 is glued thereto.

The mounting plate 7 consists of an aluminum plate. At the side of the mounting plate which faces the pivoting mirror 2 a number of stops 8 for positioning the pivoting mirror are provided, while a number of stops 9 and 10 for positioning two permanent magnets 11 are provided on the other side of the mounting plate.

In the mounting plate 7 a slot 12 is formed at the edges of which two oblong stops 13 are disposed whose length is smaller than the length of the slot 12. The bearing 6 can be inserted in the slot 12 between the stops 13 with a sliding movement. The width of the slot 12 is such that the mirror bearing is clamped between the stops 13 by its own elasticity.

The bearing support 5 is fitted in a slot 14 of the frame 1, two strip-shaped limbs 15 of the bearing support being disposed on both sides of a ridge 16 which bridges the slot, which ridge has a width which corresponds to the distance between the two limbs 15. After the limbs 15 have been passed through the slot 14, a plate 17 is fitted over the ends of the two limbs, in which plate 17 slots 18 are formed which correspond to the limbs 15. The bearing support 5 is finally secured in the frame 1 by twisting the ends of the limbs 15. As a result the bearing support is firmly pulled onto the ridge 16 and is thus positioned relative to the frame 1.

Around the pivoting mirror 2, the mounting plate 7 and the permanent magnets 11 an annular control coil 19 is mounted on the frame. By applying control voltages to the control coil the pivoting mirror is pivoted about its pivoting axis 20.

Further details about the mirror bearing used in the pivoting mirror arrangement in accordance with FIGS. 1 and 2 and also about that shown in FIG. 3 can be found in the Applicant's U.S. Pat. No. 4,021,096 and U.S. Patent application Ser. No. 762,430 filed Jan. 25, 1977.

FIG. 3 shows a different embodiment of the invention, having a bearing support 21 which has a bearing head 22 in which a slot 23 is formed which continues in a cylindrical rod 24. A bearing 25 made of chloroprene rubber comprises a lower flange 27, an upper flange 26 and a connecting strip 28. The flange 27 is inserted into a slot 29 in the bearing head 22, so that with the aid of an auxiliary tool (not shown) the slot 23 can be widened temporarily.

The mounting plate 30 has stops 31 and 32 for a pair of permanent magnets and stops 33 and 34 for a pivoting mirror. An opening 35 is located in the center which opening in respect of its dimensions corresponds to the upper flange 26 of the mirror bearing 25. Along the edges stops 36 and 37 are located. The upper flange 26 of the mirror bearing 25 can be glued to the pivoting mirror, for example with the said glue Loctite-D. The stops 36 and 37 serve for positioning the mirror bearing during glueing.

What is claimed is:

1. An electrically controllable pivoting mirror arrangement suitable for use in an apparatus for optically reading information tracks of an information carrier with the aid of a beam of radiation, or for writing information tracks on an information carrier comprising:
   a frame;
   a pivoting mirror having a reflective front and a back;
   a mounting plate connected on one side to the back of the mirror;
   mirror positioning means on the side of said mounting plate connected to the mirror for preventing relative motion between the mirror and the mounting plate;

a permanent magnet connected to a side of the mounting plate opposite the side that is connected to the mirror;

magnet positioning means on the side of the mounting plate connected to the magnet for preventing relative motion between the magnet and the mounting plate; and a mirror support means for pivotally supporting the pivoting mirror and comprising a bearing support connected to the frame, and a mirror bearing extending through the mounting plate between the bearing support and the back of the mirror.

2. An electrically controllable pivoting mirror arrangement as claimed in claim 1, wherein the mirror bearing consists of a rubber-like elastic bearing which is mounted at the back of the pivoting mirror, the distance between the bearing support and the back of the pivoting mirror being less than 3 mm, and wherein the mounting plate is provided with bearing mounting means on both sides of the mirror bearing between which a part of the mirror bearing is clamped by its own elasticity.

3. An electrically controllable pivoting mirror arrangement as claimed in claim 1, wherein the mirror bearing consists of a rubber-like elastic bearing which is glued to the back of the pivoting mirror and the distance between the bearing support and the back of the pivoting mirror being less than 3 mm, and wherein the mounting plate is provided with means for positioning the mirror bearing.

* * * * *